Feb. 22, 1927.

C. WÜTHRICH

MOLD DISK FOR DOUGH PRESSES

Filed Aug. 5, 1926

1,618,256

Inventor
Christian Wüthrich
By
Atty.

Patented Feb. 22, 1927.

1,618,256

UNITED STATES PATENT OFFICE.

CHRISTIAN WÜTHRICH, OF NIEDERUZWIL, SWITZERLAND, ASSIGNOR TO THE FIRM GEBRÜDER BÜHLER, OF UZWIL, SWITZERLAND.

MOLD DISK FOR DOUGH PRESSES.

Application filed August 5, 1926, Serial No. 127,364, and in Switzerland July 13, 1926.

Articles made from dough, such as vermicellis, macaronis and the like, are generally manufactured by the aid of dough presses in which below the cylinder containing the dough a mold disk is arranged and provided with a plurality of apertures or nozzles the cross-sectional area of which corresponds to the article to be made and which impart the desired shape to the dough squeezed through these apertures. In order to produce the short, crescent shaped type of macaronis, the so-called "elbows," the means illustrated in Figs. 8–10 of the accompanying drawings have hitherto been used. Fig. 8 hows a portion of a mold plate in a vertical section, Fig. 9 is a plan-view of Fig. 8 and Fig. 10 is a horizontal section along line X—X in Fig. 8. Each such aperture in the mold plate comprises in its upper part A a number of channels 1, 2, 3, 4 through which the dough enters and in its lower part B a tubular mold channel around the guide pin 6 and communicating with the channels 1—4. The guide pin 6 is arranged at an angle to the axis of the aperture and the lower part 7 of the mold channel 6 is unsymmetrical to the lower part 8 of the guide pin 5 as is shown in Figs. 9 and 10. By means of such mold disks crescent shaped elbows C indicated in dash and dot lines in Fig. 8 can be produced, however the wall on the convex portion 9 of the article C is thinner than on the concave portion 10. This is an important disadvantage inasmuch as such articles dry unequally and when cooking the elbows the portion 9 is sooner cooked than the portion 10.

It is the object of the present invention to overcome this drawback. The mold plate for dough presses, which is provided with a plurality of molding apertures or nozzles having in their upper part a plurality of channels for feeding the dough and in its lower part a mold channel surrounding a guide pin and communicating with said feed channels, shows the characteristic features that the guide pin is straight and is concentrically arranged in said mold channel, and that the feed channels have unequal cross-sections and are so arranged that the feed channels with smaller cross-section are diametrically opposite the feed channels with larger cross-sections. Thereby dough forced through the mold channel is subjected to a higher pressure on one side of the guide pin than on the other side so that a crescent shaped or curved article is obtained.

A constructional example of the subject matter of the present invention is illustrated on the accompanying drawing, in which.

Figure 7:
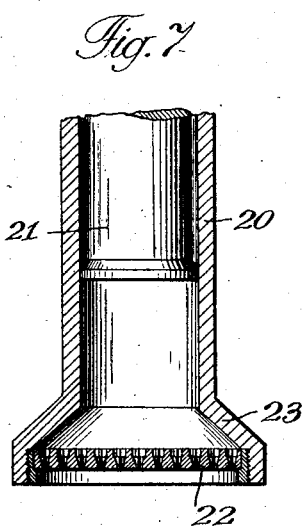
Fig. 7 is a vertical section through the lower part of the cylinder of a dough press and provided with the mold plate according to the present invention.
Figure 1:
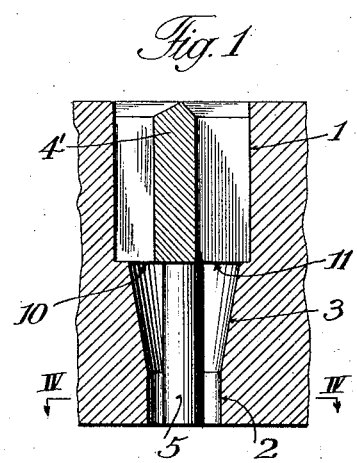
Fig. 1 is a vertical section through a portion of the mold plate showing one of the apertures or nozzles, through which the dough is squeezed.
Figure 3:
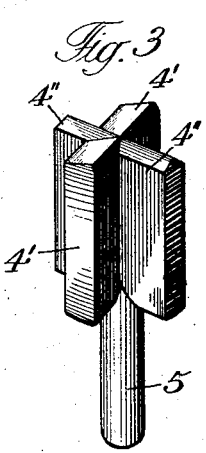
Fig. 3 shows in a perspective view the guide pin inserted in the nozzle.
Figure 2:
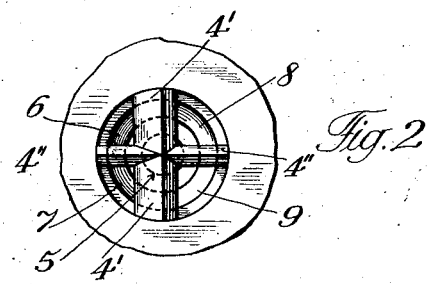
Fig. 2 is a plan-view of Fig. 1.

Referring to the press shown in Fig. 7, 20 denotes the press-cylinder, 21 is the piston by means of which the dough filled into the cylinder is squeezed through the apertures of the mold plate 22, the latter being fixed to the lower enlarged part 23 of the press-cylinder.

Figure 4:
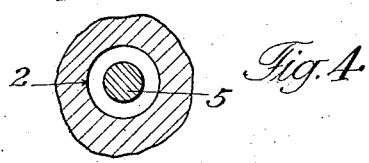
Fig. 4 is a section along line IV—IV in Fig. 1.

The aperture or nozzle illustrated in Figs. 1–4 comprises an upper cylindrical part 1, a lower cylindrical part 2 of a smaller diameter and a tapering part 3 arranged between the two cylindrical parts 1 and 2. In the aperture a member is inserted the upper part of which consists of a cross-piece 4' 4" and the lower part of a guide pin 5. The latter is concentric to the axis of the aperture (as is shown in Fig. 4) and one of the wings 4' of the cross-piece is thicker than the other wing 4" so that the channels in the upper part 1 through which the dough is fed have unequal cross-sections, the channels 6 and 7 having a smaller cross-section than the channels 8 and 9. Thus the dough at 10 and 11 on opposite sides of the guide pin 5 is subjected to different pressures, the pressure at 11 being higher owing to the larger cross-section of the feed channel than the pressure at 10 so that in spite of the concentric position of the guide pin 5 in the aperture a curved product as is indicated in dash and dot lines at 12 in Fig.

5 is produced. In contradistinction to the known articles of this kind the article produced by the above described means has a uniform wall thickness so that the drying and the cooking of these articles is uniform.

Figure 5:
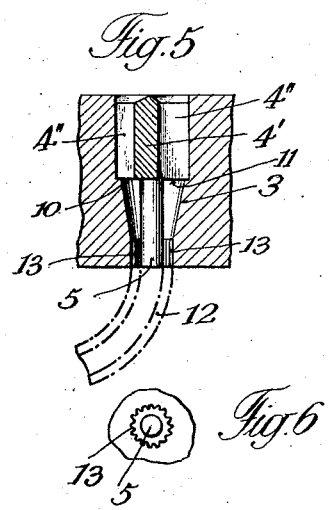
Fig. 5 shows the same section as Fig. 1 but on a smaller scale incorporating a detail variation, the article to be produced being indicated in dash and dot lines.
Figure 8:
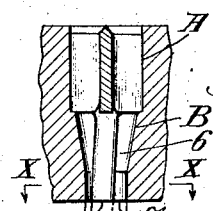
Figure 6:
Fig. 6 is a view of the lower end of Fig. 5.
Figure 6:
Figure 10:
Figure 9:
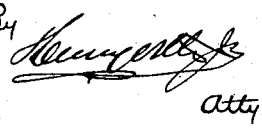

The lower cylindrical part 3, i. e. the mold channel, may be provided with longitudinal grooves as is indicated in Figs. 5 and 6 at 13 in order to produce elbows the outer surface of which is fluted or ribbed.

I claim:

1. A mold plate for dough presses having a plurality of apertures through which the dough is squeezed, and means arranged in every aperture and adapted to form an annular channel of the lower part of said aperture and to form cross-sections in the upper part of said aperture which have different areas at diametrically opposite sides.

2. A mold plate for dough presses having a plurality of apertures through which the dough is squeezed, and a member inserted in each aperture, the upper portion of said member being eccentrically arranged in the upper portion of said aperture and the lower portion of said member being concentrically arranged in the lower portion of said member.

3. A mold plate for dough presses having a plurality of apertures through which the dough is squeezed, the upper part of said apertures having a plurality of feed channels, and a straight guide pin concentrically arranged in the lower part of said aperture, said feed channels having different cross-sections on diametrically opposite sides for producing a curved product.

4. A mold plate for dough presses having a plurality of apertures through which the dough is squeezed, and a member inserted in each aperture and consisting in its lower part of a straight guide pin concentrically arranged in the lower part of said aperture and of an unsymmetric cross-piece eccentrically arranged in the upper part of said aperture.

In testimony whereof, I have signed my name to this specification.

CHRISTIAN WÜTHRICH.